(12) United States Patent
Lindholm et al.

(10) Patent No.: US 11,365,721 B2
(45) Date of Patent: Jun. 21, 2022

(54) WIND ENERGY PARK WITH AIRBORNE WIND ENERGY SYSTEMS AND A DIRECT CURRENT (DC) INTERNAL GRID

(71) Applicant: VESTAS WIND SYSTEMS A/S, Aarhus N (DK)

(72) Inventors: Morten Lindholm, Højbjerg (DK); Thomas S. Bjertrup Nielsen, Randers SV (DK); Torben Petersen, Åbyhøj (DK); Lars Helle, Suldrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/964,186

(22) PCT Filed: Jan. 22, 2019

(86) PCT No.: PCT/DK2019/050025
§ 371 (c)(1),
(2) Date: Jul. 22, 2020

(87) PCT Pub. No.: WO2019/141334
PCT Pub. Date: Jul. 25, 2019

(65) Prior Publication Data
US 2021/0033069 A1    Feb. 4, 2021

(30) Foreign Application Priority Data

Jan. 22, 2018    (DK) .......................... PA 2018 70039

(51) Int. Cl.
*F03D 9/25* (2016.01)
*B64C 39/02* (2006.01)
(Continued)

(52) U.S. Cl.
CPC ............ *F03D 9/257* (2017.02); *B64C 39/022* (2013.01); *F03D 5/00* (2013.01); *F03D 7/00* (2013.01);
(Continued)

(58) Field of Classification Search
CPC ... F03D 9/257; F03D 5/00; F03D 7/00; B64C 31/06; B64C 39/022; H02J 3/16;
(Continued)

(56) References Cited

U.S. PATENT DOCUMENTS 8,066,225 B1    11/2011   Tigner
2010/0232988 A1*  9/2010   Creighton ................ F03D 5/00
                                                       417/334
(Continued)

FOREIGN PATENT DOCUMENTS

CN    202441545 U    9/2012
CN    106150920 A    11/2016
(Continued)

OTHER PUBLICATIONS

Danish First Technical Examination for PA 2018 70039 dated Aug. 7, 2018.
(Continued)

*Primary Examiner* — Sean Gugger
(74) *Attorney, Agent, or Firm* — Patterson + Sheridan, LLP

(57) ABSTRACT

The present invention relates to wind energy park connected to an electrical grid, having airborne wind energy systems (AWES), e.g. with kites. The wind energy park has an electrical DC network connecting the plurality of AWES and a grid converter unit for converting DC to AC, and transmit AC to the electrical grid. The wind energy park control unit controls the AWES to produce electrical power to the electrical grid by alternating between a power production (Continued)

US 11,365,721 B2

Page 2 phase, and a recovery phase so to balance the supply of power to the electrical grid according a demanded setpoint. An advantage is that the grid converter may be smaller, as compared to an AC network, because the power is evened out with the negative power from the AWES being in recovery phase. In this way, the invention stabilizes the grid and has a grid forming capability.

13 Claims, 8 Drawing Sheets

(51) Int. Cl.
F03D 5/00 (2006.01)
F03D 7/00 (2006.01)
H02J 3/16 (2006.01)
H02J 3/32 (2006.01)
H02J 3/38 (2006.01)
B64C 31/06 (2020.01)

(52) U.S. Cl.
CPC ....... *H02J 3/16* (2013.01); *H02J 3/32* (2013.01); *H02J 3/381* (2013.01); *B64C 31/06* (2013.01); *H02J 2300/24* (2020.01); *H02J 2300/28* (2020.01); *H02J 2300/40* (2020.01); *H02J 2310/44* (2020.01)

(58) Field of Classification Search
CPC .......... H02J 3/32; H02J 3/381; H02J 2300/40; H02J 2300/43; H02J 2300/24
See application file for complete search history.

(56) References Cited

U.S. PATENT DOCUMENTS

| 2014/0091630 | A1* | 4/2014 | Kim | H02J 3/381 307/82 |
| 2014/0361122 | A1* | 12/2014 | Ruiterkamp | H02G 11/02 244/154 |
| 2015/0184639 | A1 | 7/2015 | Goessling et al. | |
| 2016/0049792 | A1* | 2/2016 | Burra | H02J 3/50 307/52 |
| 2018/0012501 | A1 | 1/2018 | Vander Lind | |

FOREIGN PATENT DOCUMENTS

| EP | 2631468 A1 | 8/2013 |
| EP | 3041738 A1 | 7/2016 |
| WO | 9745908 A1 | 12/1997 |
| WO | 2015032652 A1 | 3/2015 |
| WO | 2019141334 A1 | 7/2019 |

OTHER PUBLICATIONS

PCT Notification of Transmittal of the International Search Report and the Written Opinion of the International Searching Authority, or the Declaration for Application No. PCT/DK2019/050025 dated Apr. 23, 2019.
Mahdi Ebrahimi Salari et al., "Operation of Direct Interconnected AW Systems Under Normal and Fault Conditions," XP055579248, retrieved from the internet Apr. 9, 2019, slides 3-6.
Coleman J. et al., "Airborne wind energy: Simulation of directly interconnected synchronous generators for a novel wind energy technology," 2013 48th International universities' power engineering conference, IEEE, Sep. 2, 2013, pp. 1-6.

* cited by examiner

WIND ENERGY PARK WITH AIRBORNE WIND ENERGY SYSTEMS AND A DIRECT CURRENT (DC) INTERNAL GRID

FIELD OF THE INVENTION

The present invention relates to a wind energy park with a direct current (DC) internal grid, the wind energy park comprising a plurality of airborne wind energy systems (AWES). The invention also relates to a corresponding method for controlling a wind energy park, a corresponding control unit for a wind energy park, and a computer program product enabling a computer system to carry out the operations of the method.

BACKGROUND OF THE INVENTION

Recently, a new class of wind energy converters has received a considerable interest known commonly as 'airborne wind energy systems' (AWES), which are capable of capturing the wind energy in atmospheric layers not reachable by traditional wind turbines mounted on the ground.

Various airborne wind energy systems, being capable of capturing wind energy at a higher altitude than traditional wind turbines, are known. Common to these systems is that a part of the system is launched to a high altitude, where the energy of the wind is harvested. The harvested energy is transferred to a ground station, either in the form of mechanical energy, or in the form of electrical energy.

In the case that the transferred energy is in the form of electrical energy, the airborne wind energy system comprises an airborne generator, i.e. the part of the system which is launched to a high altitude includes a generator. The part of the airborne wind energy system being launched to a high altitude may, e.g., include a kite or a glider.

In the case that the transferred energy is in the form of mechanical energy, a generator will normally be arranged at the ground station in order to convert the mechanical energy into electrical energy. The ground station can be fixed, or it can be moveable.

A number of airborne wind energy systems (AWES) are described in the review by Cherubini, et al., 'Airborne Wind Energy Systems: A review of the technologies', Renewable and Sustainable Energy Reviews, 51 (2015) 1461-1476.

Following the maturing of the various kinds of AWES with an individual power production in the interval around 100 kW-2 MW, the planning and design of wind energy parks, or wind energy farms, with a large number of AWES, e.g. up to hundreds of AWES has now started. Such large scale use of AWES may represent a technical challenge due to differences as compared with other renewable energy sources, e.g. solar PV and conventional wind turbines. In particularly, the integration of these large wind energy parks with a plurality of AWES with the electrical grid may represent a problem with the typically many requirements and detailed constraints for producing electrical energy to the electrical grid in most countries and areas, these grid requirements normally being regulated by the transmission system operators (TSO). Compliance with such grid requirements is therefore of importance for the widespread application of wind energy parks with AWES.

Hence, an improved wind energy park connected to an electrical grid would be advantageous, and in particular a more efficient and/or reliable wind energy park would be advantageous.

OBJECT OF THE INVENTION

It is a further object of the present invention to provide an alternative to the prior art.

In particular, it may be seen as an object of the present invention to provide a wind energy park connected to an electrical grid that solves the above mentioned problems of the prior art with grid integration.

SUMMARY OF THE INVENTION

Thus, the above described object and several other objects are intended to be obtained in a first aspect of the invention by providing a wind energy park connected to an electrical grid, the wind energy park comprises a plurality of airborne wind energy systems (AWES), each airborne wind energy system comprises:
  a kite connected via a cable to a ground station,
  a winch system controlling the extraction and retraction of said cable from the ground station, the winch system further being connected to an electrical generator for converting kinetic, rotational energy to electrical power as an alternating current (AC),
  an AC to DC converter for converting the electrical energy to direct current (DC), the wind energy park further comprises:
  an electrical DC network connecting the plurality of AWES with
  a grid converter unit for converting DC to AC, and transmit said AC to said electrical grid, and
  a wind energy park control unit for controlling the plurality of AWES to produce electrical power to the electrical grid by alternating each AWES between:
    a power production phase, wherein the corresponding cable is extracted by the winch system so as to produce electrical power from the corresponding electrical generator, and
    a recovery phase, wherein the corresponding cable is retracted by the winch system so as to consume electrical power from the corresponding electrical generator;
  so that a first subset of AWES within the plurality of AWES are in a production phase, and a different, second subset of AWES within the plurality of AWES are in a recovery phase, respectively, and balancing the supply of power to the electrical grid according a demanded setpoint.

The invention is particularly, but not exclusively, advantageous for providing a wind energy park with a plurality of AWES, which may stabilise the power production from such a wind energy park. A particular advantage of having the AWES connected via an electrical DC network is that the grid converter unit may be smaller, as compared to an AC network, because the AWES in power production phase is to some extent evened out with the negative power from the AWES in recovery phase. In this way, the invention may stabilise the grid and/or may have a grid forming capability, particular by a single grid converter connecting the DC network to the electrical grid. Furthermore, due to the DC network, any energy storage should be comparably less in the DC link, due to the sharing the required installed energy storage. It is further contemplated that a wind energy park with AWES, in particular kites, may have a smaller need for space as compared to wind turbines mounted on the ground, and therefore the implementation of a DC network between the plurality of AWES is more advantageous.

In the context of the present invention, it is also to be understood that balancing the supply of the net power production from the plurality of airborne wind energy systems (AWES) to the electrical grid is generally interpreted in a broad way, e.g. the net power production may be required to meet certain absolute one, or more, parameters, e.g. active power (P), frequency, voltage, current, and/or reactive power (Q), or changes over time, e.g. ramp rates of the aforementioned absolute parameters, and relative numbers between said absolute parameters, e.g. during or after a grid event, such as a fault ride-trough event (incl. a low voltage-ride through event LVRT or zero-voltage ride through ZVRT event).

In the context of the present invention, it is also to be understood that a kite is generally interpreted in a broad way i.e. as a wind engaging member suitable for wind energy harvesting in large heights, the kite being durable for an extended period for power production and connected to the ground via one, or more, suitable cables. The present invention is primarily intended for AWES having electrical generators on the ground, though it is contemplated that the principle of the present invention also could be applied to some concepts where the electrical generator is airborne, too. In the present application, the abbreviation 'AWES' may be used both as an abbreviation for a single airborne wind energy system, and as an abbreviation for several airborne wind energy systems i.e. in plural, the appropriate meaning being given by the context.

In the context of the present invention, it is to be understood that a AWES may change from the recovery phase to the power production phase sufficiently fast at a relevant time scale with the respect to the need for balancing the supply of the net power production, e.g. at the order of seconds, preferably within 0.1 second, within 1 second, within 3 seconds, or within 5 seconds. The skilled person in AWES will understand that this may impose certain limits and constraints to the design and/or operation of the kites suitable for this purpose.

For a wind energy park in partial load and if there is a need for additional power there is, besides taking AWES from recovery phase to power production phase, the possibility of increasing the power production for the kites in power production phase by changing pitch angle and speed of the kite or by moving the kite further into areas of operation giving increased pull or extraction force in the cable to increase power. Kites in power production phase might operate to give optimal power production already, but in other cases they might not. Also for short periods one may allow for additional high pull or extraction force, and thereby power, compared to the standard operation. This may be an advantageous action for increasing power from the wind energy park relatively fast, because it will normally take some time for kites in recovery phase to move into power production phase. In case of need of more park power consumption in the wind energy park, the kites already in recovery phase can be pulled in faster. I.e. there are two modes that can supplement each other: 1. Kites are taken from power production phase to recovery phase and 2. Kites already in recovery phase are pulled in faster.

In some embodiments, if a grid event has taken place in the connected electrical grid, said grid event being a fault ride through (FRT) event according to a grid requirement, the wind energy park control unit may further arranged for balancing the supply of the net power production from the plurality of airborne wind energy systems to the electrical grid according to said grid requirement during a FRT event. Thus, the wind energy park can adjust correspondingly the produced power during such a grid loss, or a similar event with poor grid quality.

In this way, the invention may particularly stabilise the grid and/or may have a grid forming capability.

Additionally, said balancing the supply of reactive power and/or active power to the electrical grid according to said grid requirement, may further comprise:
balancing the supply comprises changing said one, or more, AWES from the recovery phase to the power generation phase to increase reactive power (Q) and/or active power (P) produced from said plurality of AWES, and/or
balancing the supply comprises changing said one, or more, AWES from the power generation phase to the recovery phase to decrease reactive power (Q) and/or active power (P) produced from said plurality of AWES.

Further, if the grid event is a fault ride-through (FRT) event and the balancing may comprise:
the first subset of AWES to produce a first amount of power, and
the second subset of AWES to consume a second amount of power, so that the wind energy park supplies an amount of total power, preferably reactive power (Q) and active power (P) to the electrical grid in concord with said FRT event, preferably in concord with a lower set point of power, preferably reactive and active power, current and/or voltage, more preferably approximately zero reactive and active power, current and/or voltage.

In advantageous embodiments, if a grid event has taken place in the connected electrical grid, said grid event being a need for frequency regulation, the method further may comprise:
balancing the supply comprises changing said one, or more, AWES from the recovery phase to the power generation phase to increase active power (P) produced from said plurality of AWES, and/or
balancing the supply comprises changing said one, or more, AWES from the power generation phase to the recovery phase to decrease active power (P) produced from said plurality of AWES.

In other advantageous embodiments, the first subset of AWES may have a reduced power production by actively extending the cable length(s) from the winch system for one, or more, AWES within said first subset.

In alternative advantageous embodiments, the first subset of AWES may have a reduced power production by aerodynamically operating one, or more, AWES within said first subset so as to reduce an extraction force on the corresponding cable(s).

In other preferred embodiments, the second subset of AWES may have an increased power consumption by actively lowering the cable length(s) from the winch system for one, or more, AWES within said second subset.

In yet other preferred embodiments, the second subset of AWES may have an increased power consumption by aerodynamically operating one, or more, AWES within said second subset so as to increase a retraction force on the corresponding cable(s).

In some embodiments, the wind energy park control unit may be arranged for controlling a third subset of AWES during a ZVRT event to be operated in a neutral mode neither producing nor consuming power, preferably by applying a mechanical brake on the cable in the corresponding ground stations for said third subset of AWES, alternatively by aerodynamically bringing the kite in a situation where the lift force is balanced with gravity. In this way, the third subset of AWES may be in an idling mode of operation.

In some embodiments, the wind energy park may further comprise electrical switching equipment capable of consuming excess energy from the plurality of AWES in case of a grid event, preferably in a resistor otherwise used in said electrical switching equipment, the resistor functioning as a 'energy sink' for excess energy in the wind energy park.

Preferably, the AC to DC converter for converting the electrical power to direct current (DC) for each AWES comprises an active rectifier, preferably with four quadrant operational capability, though it is also contemplated that the some AWES may share a AC DC converter by appropriate control and connection therefore.

In preferred embodiments, the wind energy park may be electrically connected to one, or more, energy storage units, preferably for use in case of said grid event, for storing excess energy, or delivering additional energy to electrical grid, if required in said balancing so as to better meet the demands from the electrical grid.

In some embodiments, the wind energy park with a plurality of AWES may be electrically integrated, e.g. in an electrical subgrid, with one, or more, other power generating sources, preferably based on solar energy, hydro energy, geothermal energy, and/or wind energy, preferably from wind turbines mounted on the ground.

In a second aspect, the present invention relates to a wind energy park control unit for controlling an associated wind energy park connected to an electrical grid, the wind energy park comprises a plurality of airborne wind energy systems (AWES), each airborne wind energy system comprises:
- a kite connected via a cable to a ground station,
- a winch system controlling the extraction and retraction of said cable from the ground station, the winch system further being connected to an electrical generator for converting kinetic, rotational energy to electrical power as an alternating current (AC),
- an AC to DC converter for converting the electrical power to direct current (DC),
- the wind energy park further comprises an electrical DC network connecting the plurality of AWES and a grid converter unit for converting DC to AC, and transmit said AC to said electrical grid,
- wherein the wind energy park control unit is arranged for controlling the plurality of AWES to produce electrical power to the electrical grid by alternating each AWES between:
  - a power production phase, wherein the corresponding cable is extracted by the winch system so as to produce electrical power from the corresponding electrical generator, and
  - a recovery phase, wherein the corresponding cable is retracted by the winch system so as to consume electrical power from the corresponding electrical generator;

so that a first subset of AWES within the plurality of AWES are in a production phase, and a different, second subset of AWES within the plurality of AWES are in a recovery phase, respectively, and balancing the supply of power to the electrical grid according a demanded setpoint.

In a third aspect, the present invention relates to a method for controlling a wind energy park connected to an electrical grid, the wind energy park comprises a plurality of airborne wind energy systems (AWES), an electrical DC network connecting the plurality of AWES, and
a grid converter unit for converting DC to AC, and transmit said AC to said electrical grid,
wherein each airborne wind energy system comprises:
- a kite connected via a cable to a ground station,
- a winch system controlling the extraction and retraction of said cable from the ground station, the winch system further being connected to an electrical generator for converting kinetic, rotational energy to electrical power as an alternating current (AC),
- an AC to DC converter for converting the electrical power to direct current (DC), the method comprises:
  - controlling the plurality of AWES to produce electrical power to the electrical grid by alternating each AWES between:
    - a power production phase, wherein the corresponding cable is extracted by the winch system so as to produce electrical power from the corresponding electrical generator, and
    - a recovery phase, wherein the corresponding cable is retracted by the winch system so as to consume electrical power from the corresponding electrical generator;

so that a first subset of AWES within the plurality of AWES are in a production phase, and a different, second subset of AWES within the plurality of AWES are in a recovery phase, respectively, and
balancing the supply of power to the electrical grid according a demanded setpoint.

In a fourth aspect, the invention relates to a computer program product being adapted to enable a computer system comprising at least one computer having data storage means in connection therewith to control an wind energy park according to the third. aspect of the invention.

This aspect of the invention is particularly, but not exclusively, advantageous in that the present invention may be accomplished by a computer program product enabling a computer system to carry out the operations of the third aspect of the invention when down- or uploaded into the computer system. Such a computer program product may be provided on any kind of computer readable medium, or through a network.

In a fifth aspect, the invention relates to a wind energy park connected to an electrical grid, the wind energy park comprises a plurality of airborne wind energy systems (AWES), each airborne wind energy system comprises:
- a kite connected via a cable to a ground station, the kite comprising an electrical generator for converting wind energy to electrical power to the electrical grid,
- an AC to DC converter for converting the electrical power to direct current (DC),
the wind energy park further comprises:
- an electrical DC network connecting the plurality of AWES,
- a grid converter unit for converting DC to AC, and transmit said AC to said electrical grid,
- a wind energy park control unit for controlling the plurality of AWES to produce electrical power to the electrical grid by alternating each AWES between:
  - a power production phase producing electrical power from the corresponding electrical generator, and
  - a recovery phase consuming electrical power from the corresponding electrical generator;

so that a first subset of AWES within the plurality of AWES are in a production phase, and a different, second subset of AWES within the plurality of AWES are in a recovery phase, respectively, and balancing the supply of power to the electrical grid according a demanded setpoint.

This aspect of the invention may thus relate to AWES, wherein the electrical generator is positioned on the kite and the cable transmits electrical power to the ground station.

The individual aspects of the present invention may each be combined with any of the other aspects. These and other aspects of the invention will be apparent from the following description with reference to the described embodiments.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
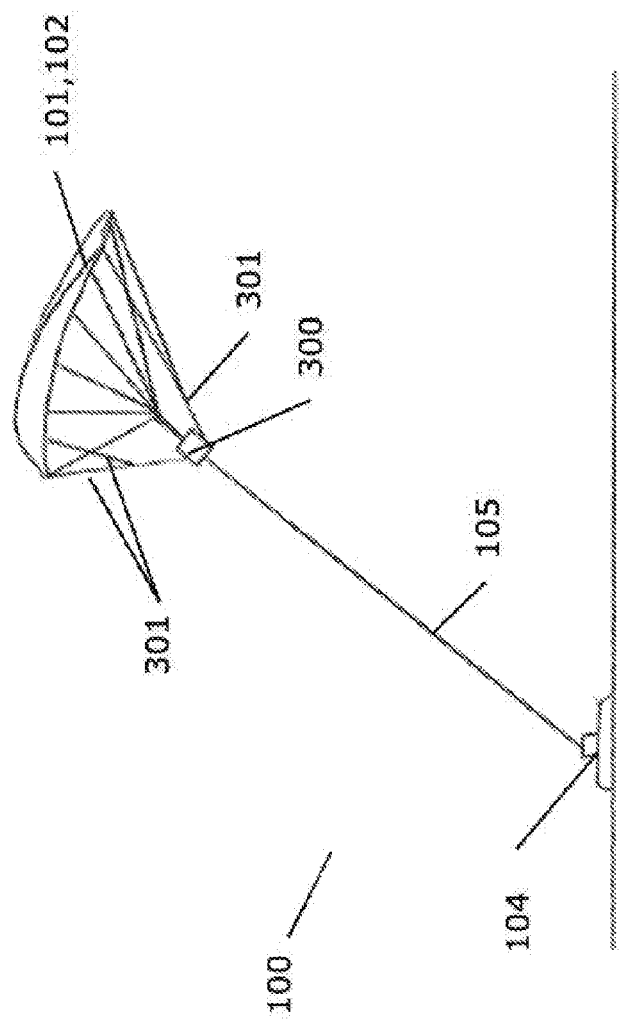
FIG. 1 is a perspective view of an airborne wind energy syste use in a wind energy park according to an embodiment of the invention, FIG. 2 illustrate a wind energy park with a number of airborne wind energy systems according to embodiments of the invention, FIG. 3 schematically illustrate how the airborne wind energy systems according to embodiments of the invention may change from a recovery phase to a power production phase, FIG. 4 schematically illustrate how the airborne wind energy systems according to embodiments of the invention may be considered as two separate subsets according to embodiments of the invention, FIG. 5 schematically illustrate how the airborne wind energy systems according to embodiments of the invention may be electrically connected in an internal DC network.

FIG. 1 is a perspective view of an airborne wind energy system 100 for use in a wind energy park an according to embodiments of the invention. The airborne wind energy systems 100 comprises a wind engaging member 101 catching and moved by the wind and connected to a ground station 104 via one or more cables 105. The wind engaging member 101 is in the form of a kite connected to a control unit 300 via steering lines 301 and to a winch system (not shown) in the ground station 104 typically via a single cable 105. The operation of the kite 101 can be fully or partly controlled by the operation of the steering lines 301 by the control unit and in addition to the extraction and retraction of the cable 105 controlled from the winch system.

The extraction of the cable 105 from the winch system generates mechanical energy which is transferred via the winch system to a generator positioned on the ground station 104. The generator is in turn electrically coupled to a power transmission line and to a power grid and/or power storage optionally via a converter and/or transformer.

Typically, the kite operation comprises a power generation or production phase of upwards movement of the kite where the kite 101 may extract the cable 105 upon action of the wind 501. Here, the wind acting on the kite 101 and the tensioning forces in the cable 105 and in the steering lines 301 cause the kite to move along a flight trajectory having the shape of an upwards spinning figure eight or circular pattern. Subsequently, the kite 101 is retracted while moving along a substantially linear path. During this recovery phase wherein the kite 101 is retracted, energy may be consumed.

However, the energy consumed is expected to be less than the energy being generated during the upwards spinning movement of the kite 101. Upon reaching a minimum height, the kite is operated to enter a new power generation phase. Typically, the kite 101 may be extracted by the wind to a maximum height in the range of 600-1000 m depending on the type of kite, and is retracted to a minimum height in the range of 50-150 m. Typically, the recovery phase takes up in the order of 10-30% of the time of a total cycle of a power generation phase followed by a recovery phase.

Figure 2:
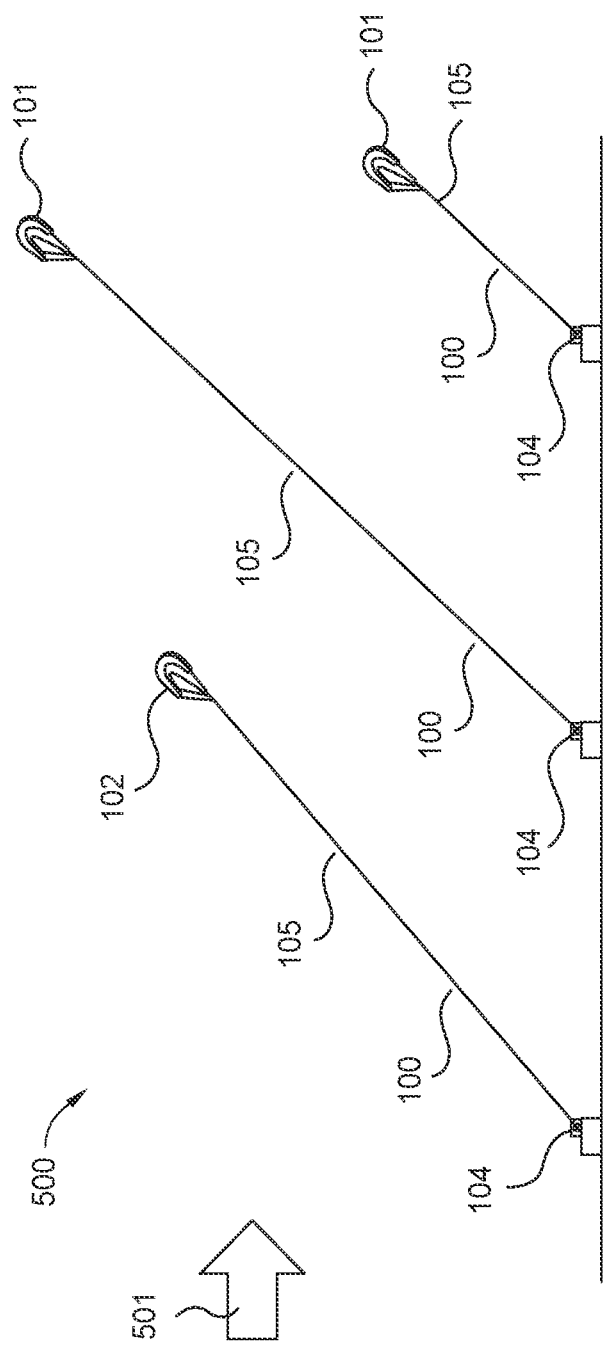

FIG. 2 illustrate the operation of airborne wind energy systems 100 in a wind energy park 500 according to an embodiment of the invention and as seen from a side. A number of airborne wind energy systems 100 are shown in the figure, each comprising a wind engaging member 101 in the form of a kite and each connected to a ground station 104 via a cable 105. The wind engaging members are here shown as all being kites 101 of the same type. However, in an embodiment, an energy park may be equipped with different types of airborne wind energy systems such as for example a kite next to a glider etc. The airborne wind energy systems 100 may be directly or indirectly connected optionally via one or more central control units, cf. FIG. 5, which in part or completely may contribute to the controlling of the plurality of airborne wind energy systems.

Figure 3:
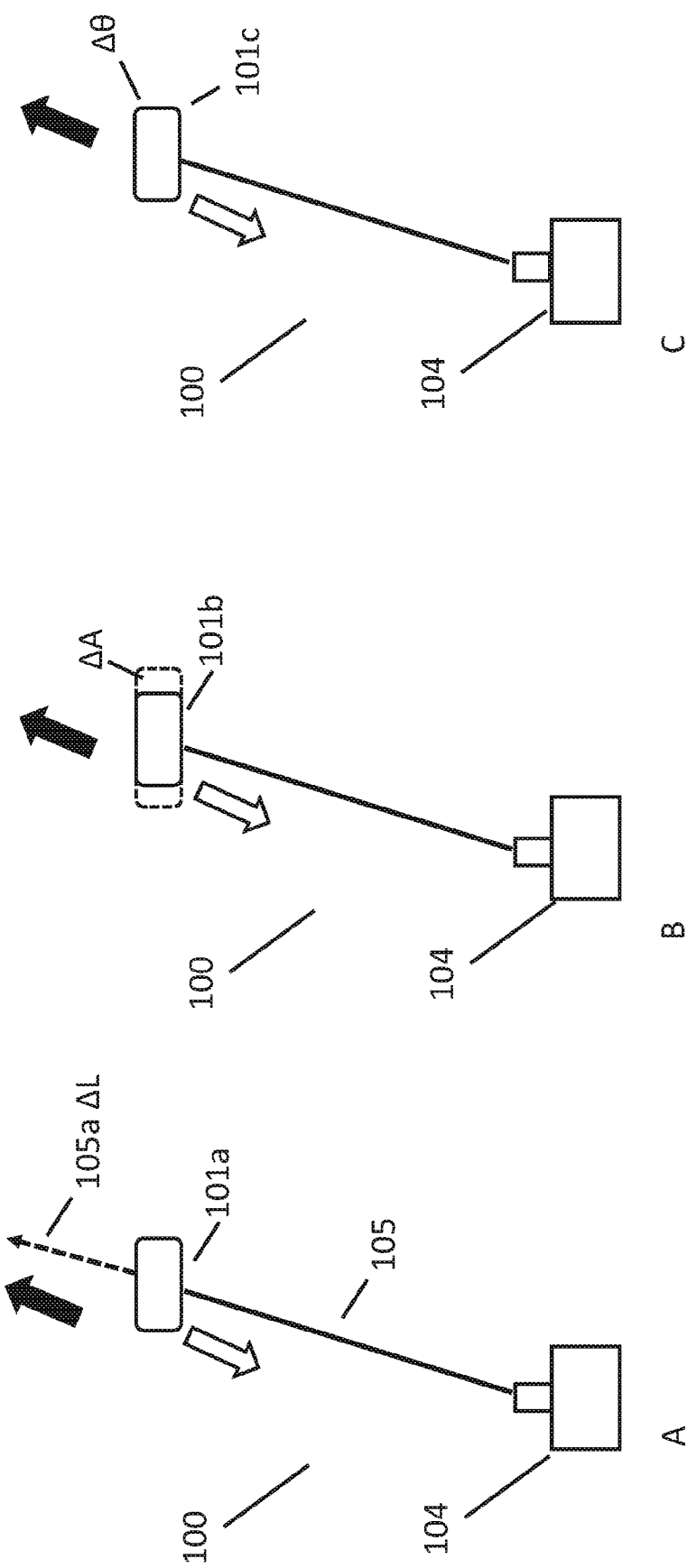

FIG. 3 schematically illustrate how the airborne wind energy systems 100 according to embodiments of the invention may change from a recovery phase to a power production phase. In FIGS. 3-6, the black arrow indicates the kite 101 being in the power production phase moving in a direction away from the ground station 104, and the white arrow indicates the kite 101 being in the recovery phase moving in a direction towards to the ground station 104.

In FIG. 3A, the change from the recovery phase to the power generation phase is performed by keeping an additional length of cable 105a ΔL in reserve for the AWES, during normal operation, said additional length of cable being for use in balancing the supply of the net power production from the plurality of airborne wind energy systems to the electrical grid. The additional length may in one example be 5%, 10%, or 15% of the total cable length. Further the intention is to design and operate the AWES so there is always a certain part of the cable in surplus, enabling that the kite 101 can always produce power. I.e. in one example 10% of the total wire length are never used during standard operation of the kite. During grid loss or events with poor grid quality the kite can use the additional wire length if necessary to balance the supply of net power production.

Additional wire length can also be required to ensure that the kite can always produce power during a grid loss or an event with poor grid quality. In one example the lower height of such a cycle of a kite can be 150 m and the higher height can be 800 m. Typically the time of the power production phase is 3 times as long as the time of the returning recovery phase, which means that in a normal wind energy park about 25% of the kite will be in a recovery phase, and according to the principle of the present invention one, or more, of these returning kites 101 can be operated as kind of power reserve for balancing the supply of net power to the electrical grid. The additional cable is meant to be used by kites in power production phase that are close to their standard upper height level, in case they need to keep producing power for an additional period. Kites in recovery phase can also change to power production phase and afterwards use the additional cable length if needed.

Additionally, or alternatively, one, or more, AWES can change from a power production phase to a recovery phase to aid in balancing the supply of power, preferably reactive power and active power, to the electrical grid according to a demanded setpoint to the wind energy park.

In FIGS. 3B and 3C, ensuring that a AWES can change from the recovery phase to the power generation phase is performed by aerodynamically operating a AWES 100 in a mode, where said change from the recovery phase to the power generation phase can be made by changing an aerodynamic parameter for use in balancing the supply of the net power production from the plurality of airborne wind energy systems to the electrical grid. Thus, in FIG. 3B the area of the kite 101b is increased resulting in engagement of more wind, and the kite will therefore start producing power again. In FIG. 3C, the pitch angle of the kite 101b is changed resulting in improved engagement of the wind, and the kite will therefore start producing power again. The skilled person in AWES will readily understand that this can be performed in various ways and with numerous means from aerodynamics of kites.

Figure 4:
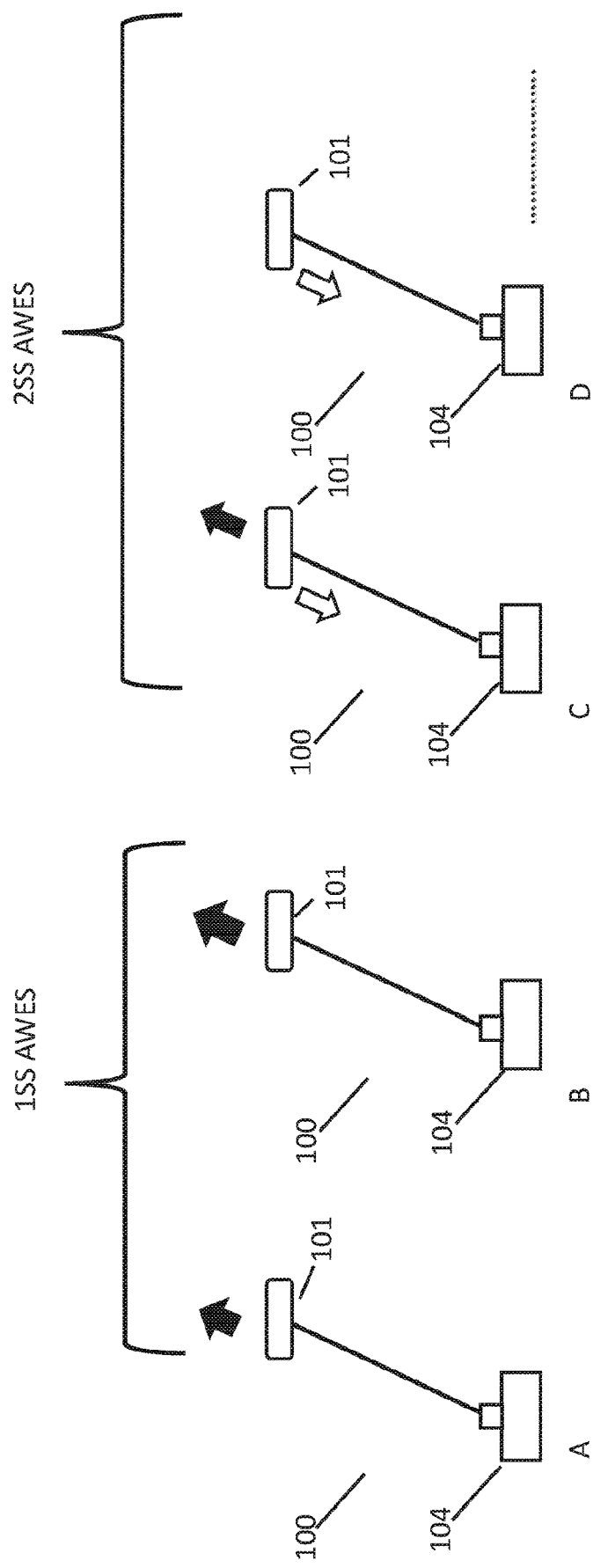

FIG. 4 schematically illustrate how the airborne wind energy systems, A, B, C, and D, according to embodiments of the invention may be considered as two separate subsets, 1SS and 2SS, according to embodiments of the invention. The skilled person will understand that the number of four AWES in this particular embodiment is not limiting, i.e. any number of AWES in a wind energy park is contemplated within the teaching and principle of the present invention, e.g. several hundred AWES. Thus, controlling the plurality of AWES to produce electrical power to the electrical grid is generally performed by alternating each AWES 101 between:

- a power production phase, wherein the corresponding cable is extracted by the winch system so as to produce electrical power from the corresponding electrical generator as indicated with black arrows, and
- a recovery phase, wherein the corresponding cable is retracted by the winch system so as to consume electrical power from the corresponding electrical generator as indicated with white arrows.

This results in a first subset 1SS of AWES within the plurality of AWES in a production phase, and a different, second subset 2SS of AWES within the plurality of AWES in a recovery phase, respectively. Certain aspects of the present invention is illustrated by the AWES named 'C' in FIG. 4, being changed from a recovery phase (white arrow) into a power production phase (black arrow).

Thereafter, the AWES named C is then part of the first subset 1SS of AWES producing power. Of course, more than one AWES can at same time be changed from one phase to another phase, FIG. 4 merely shown changing of one AWES for illustrative purposes.

Figure 5:
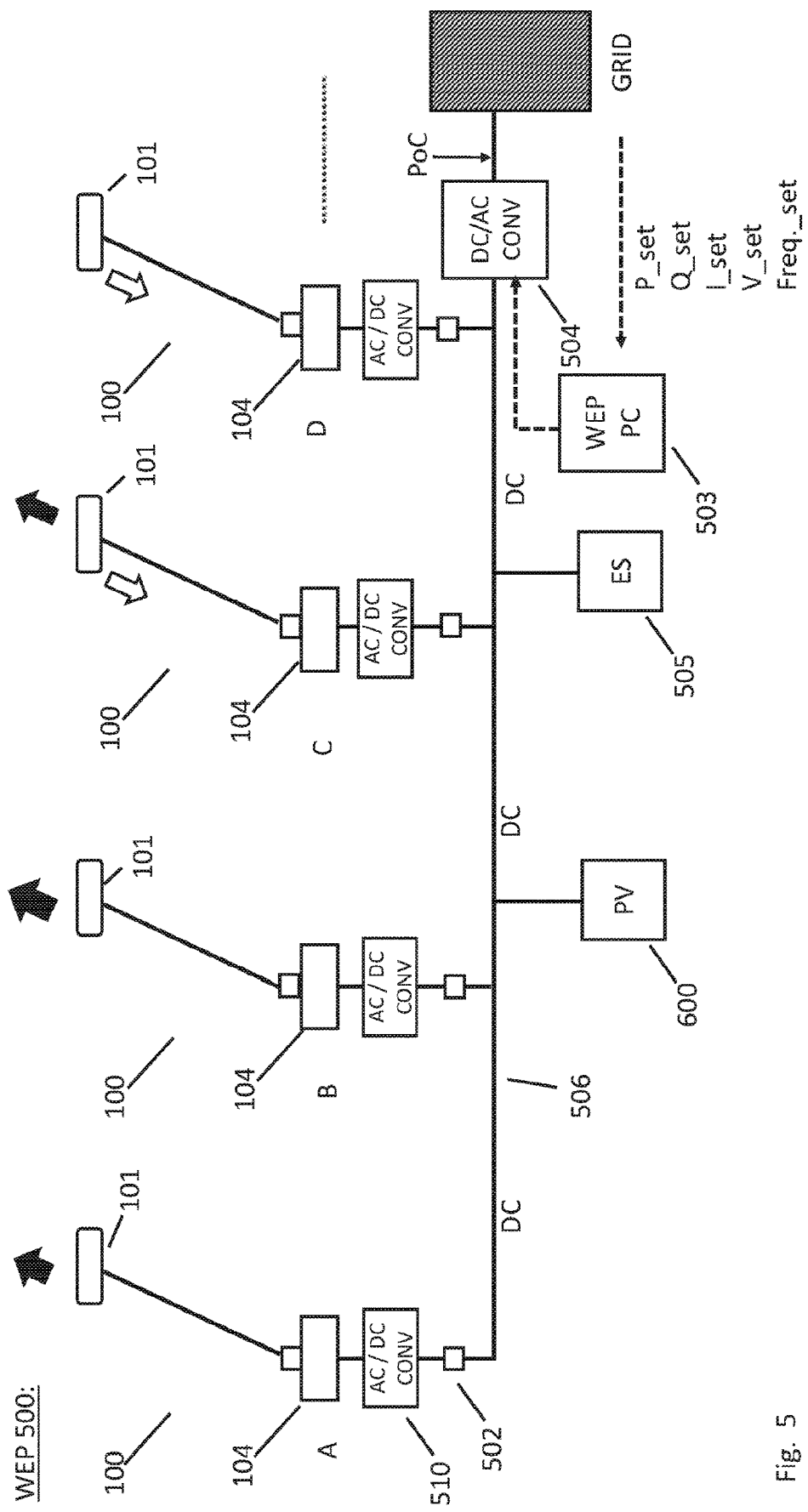

FIG. 5 schematically illustrate how the airborne wind energy systems AWES 100 according to embodiments of the invention may be electrically connected to an associated electrical grid, 'GRID' to the right of FIG. 5. Again an AWES, here the AWAS numbered 100° C., is changed from recovery phase to power production phase as indicated by the white and black arrow. Further, the AWES are electrically coupled via an AC DC converter 510, optionally for each ground station 104, and switching equipment 502 to the common DC electrical network 506, e.g. a DC subgrid. Thus, in other embodiments, some ground stations may electrically share an AC DC converter (not shown in FIG. 5).

The common DC electrical network 506 is then connected to common DC AC converter 504 for the wind energy park WEP 500. This common AC DC converter 504 is in turn-via the point of common coupling PoC-connected to the electrical grid to the right. The wind energy park 500 has a wind energy plant controller 503 for control and communication with the electric grid. The electrical grid operator may continuously transmitted certain requirements, or demands, that the wind energy park 500 should comply with to the extent possible by the wind energy park given the specific wind conditions 501, cf. FIG. 2.

Thus, values of power, preferably reactive Q_set and active power P_set, current I_set and/or voltage V_set may be required and transmitted to the plant controller 503, as schematically indicated. Optionally, the wind energy park can have electrical storage units ES, preferably for use in case of a grid event such as FRT, for storing excess energy, or delivering additional energy to electrical grid, in said balancing.

Figure 6:
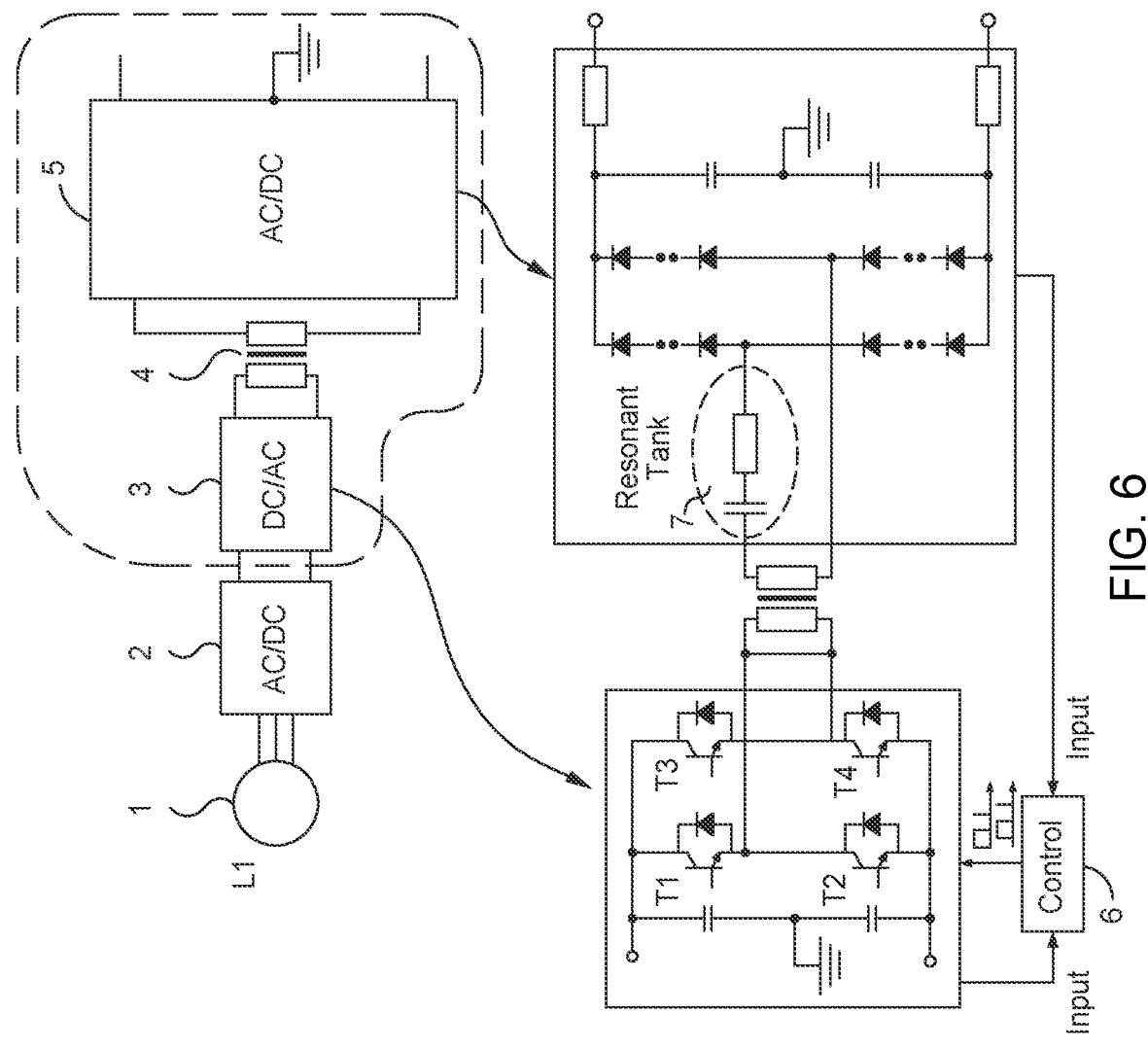
FIG. 6 shows a circuit diagram of a DC-DC power converter which can be implemented in the DC network shown in FIG. 5, and FIG. 7 schematically shows a graph of the power over time for five AWES according to the present invention.

FIG. 6 shows a circuit diagram of a DC-DC power converter which can be implemented in the DC network shown in FIG. 5. The converter is useful for converting the DC level from a voltage level of around 1000 V up to several thousand volts (kV), preferably for use in a large DC electrical network. The converter comprises a PMSM (permanent magnet synchronous machine) generator 1 and an active rectifier 2 which converts the AC output of the wind turbine into a DC voltage. The resulting DC voltage output from the rectifier 2 is provided to a full bridge inverter (DC/AC converter) 3 which is coupled to an AC/DC converter 5 via a monolithic transformer 4 with a single secondary winding. The AC/DC converter is composed of a series resonant tank (LC circuitry) 7, rectifier and output filter. Blocks 3 and 5 are shown in more detail at the bottom of FIG. 6, and a controller 6 which operates in accordance with a new control method is also shown at the bottom of FIG. 6. The controller 6 drives the DC/AC converter 3, and in particular controls the transistor switches T1, T2, T3 and T4 of the DC/AC converter 3 using a pulse width modulation (PWM) signal. PWM is used to generate a square wave voltage with a 50% duty cycle, by comparing a carrier signal (with variable frequency) with a DC signal. The controller receives as inputs a signal from the AC/DC converter 5 indicating the output voltage Vo and rectified current [Ir] and an input from the DC/AC converter 3 indicating the input voltage Vg and input dc current. Based on the received signals, the controller 6 decides on a suitable switching frequency (and optionally phase shift) for the transistor switches T1, T2, T3 and T4. More particularly, a feedforward and PI controller may be used to determine the switching frequency based on the measured inputs in accordance with Freq=Nt*Power/(16*Vg*Vo*Cres), where Nt is the transformer turns ratio and Cres is the capacitance of the resonant capacitor of the LC circuitry. The DC/AC converter 3 can be considered a primary side, while the AC/DC converter 5 can be considered a secondary side. It can be seen from the exploded view of the AC/DC converter 5 that a resonant tank 7, comprising a capacitor and inductor in series, is located on the secondary side.

Figure 7:
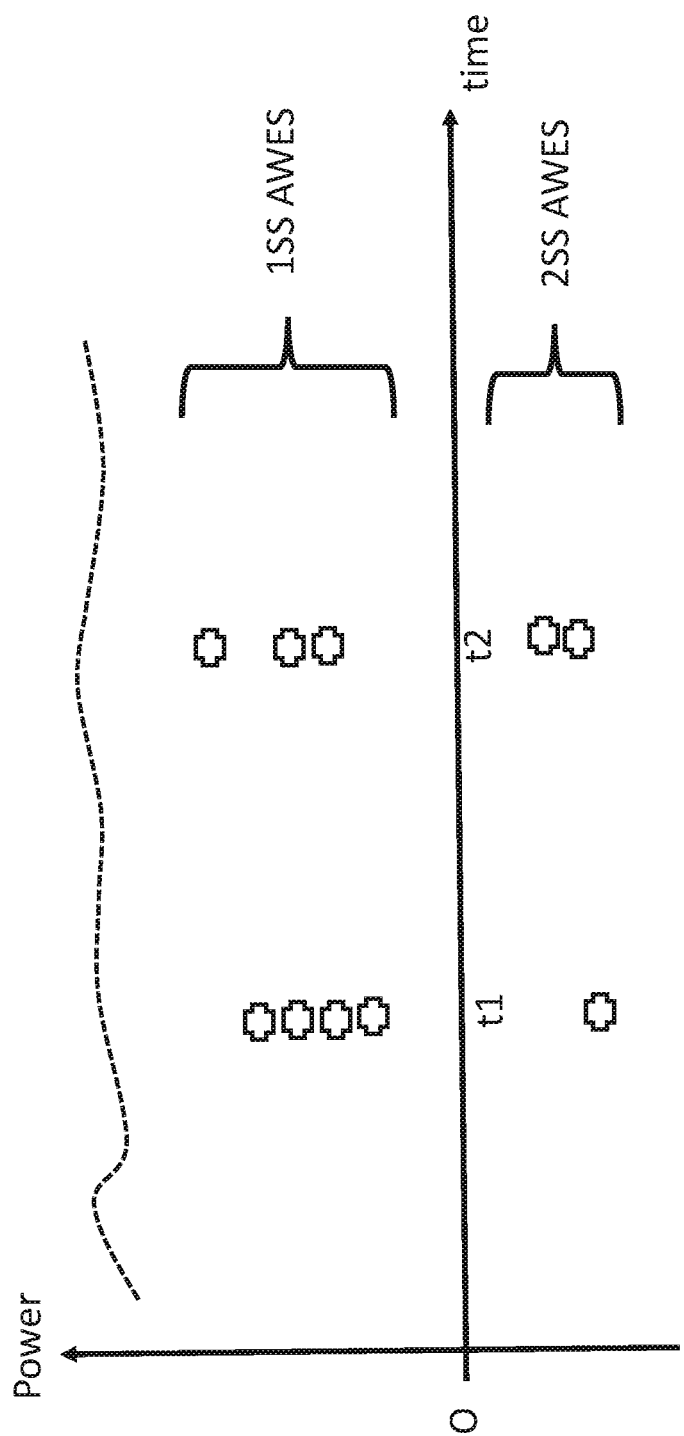

FIG. 7 schematically shows a graph of the power over time for five AWES according to the present invention. In parks with two or more AWES, the plant controller 503 operates the kites 101 in such a way that the total power produced from the park becomes as constant as possible as a running mean over some seconds (for example 10 sec, 30 sec., 60 sec). This is especially relevant in full load operation. This is done by planning and ensuring that some kites 101 are taken into recovery phase during periods where other kites are in a power production phase as indicated by the first 1SS and second 2SS subset over and under the zero power level, respectively. To ensure that it might be needed to take a kite into 101 recovery phase prior to that the kite has reached it's maximum height.

In other embodiments, a kite 101 in recovery phase is moved into power production mode prior to that it has reached its lowest height. To ensure mean power produced from the wind energy park, energy storage units in form of batteries, fly wheels or other means to store energy, can be added both at each ground unit or at one or more storage units ES 505 being part of the wind energy park, as shown in FIG. 5.

In other embodiments, the wind energy park 500 with a plurality of kites 101 is a part of an energy system with for instance solar panels and wind turbines mounted on the ground, again maybe together with energy storage units. Particular PV solar panels 600 are suitable for application in the present invention because the electrical output is normally direct current DC, as schematically shown in FIG. 5. For such systems, the PV solar panels will produce less power in periods where clouds pass by giving a shadow and the classic wind turbines will produce less power in periods with wind dips. During such events one or more kites 101 can be moved into power production mode to secure sufficient and as constant as possible total mean power from the power producing park, and other kites 101 already in power production mode might be changed towards an operation that gives more power by for instance change the pitch angle, change the kite flight path and/or height, change the kite speed etc.

FIG. 7 illustrates the power produced from a possible wind energy park with 5 kites as a function of time. The total park power is found and the power produced for each of the 5 kites are illustrated by crosses. For time t1, one kite is in return phase using a relative high amount of energy, while the 4 other kites are in power production phase producing a relative fine level of energy. At time t2, two kites are now in return phase, but using less energy compared to the return phase kite at t1 (can be controlled by the level of the pull down speed, i.e. the larger speed the more power is used), while 3 kites are in power production phase. One of the kites are operating in an optimal height with high wind speeds and generate a large amount of power, i.e. the kite is in full load generating rated power. The wind energy plant controller 503 operates the kites so that the total park power is as high as possible, but also so that the total power gets as constant as possible. This is in particular important when the kites and wind energy park is in full load operation. In partial load for the entire park, each kite 101 in power production phase is controlled so it produces as much power as possible (up to the kites rated power), while the cycle of kites taken into return phase is optimized towards delivering a smooth power level over time as schematically illustrated in FIG. 7.

Figure 8:
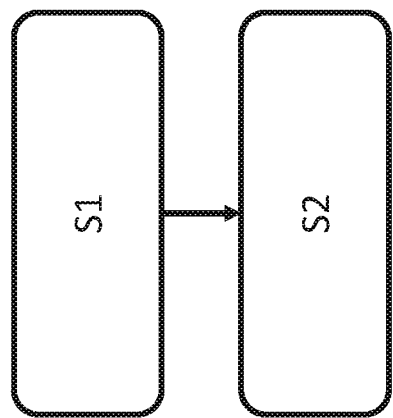
FIG. 8 is a schematic system-chart representing an outline of the operations of the method according to the invention.

FIG. 8 is a schematic system-chart representing an outline of the operations of the method according to the invention with a method for controlling a wind energy park connected to an electrical grid, the wind energy park comprises a plurality of airborne wind energy systems AWES 100, cf. FIGS. 4-5, an electrical DC network 506 connecting the plurality of AWES, and a grid converter unit 504 for converting DC to AC, and transmit said AC to the electrical grid, cf. FIG. 5. Each airborne wind energy system 100 comprises:
  a kite 101 connected via a cable to a ground station, cf. FIGS. 1-3,
  a winch system controlling the extraction and retraction of said cable from the ground station, the winch system further being connected to an electrical generator for converting kinetic, rotational energy to electrical power as an alternating current (AC),
  an AC to DC converter 510 for converting the electrical power to direct current (DC),
  the method comprises:
  S1 controlling the plurality of AWES to produce electrical power to the electrical grid by alternating each AWES between:
    a power production phase, wherein the corresponding cable is extracted by the winch system so as to produce electrical power from the corresponding electrical generator, cf. black arrows in FIGS. 3-5, and
    a recovery phase, wherein the corresponding cable is retracted by the winch system so as to consume electrical power from the corresponding electrical generator, cf. white arrows in FIGS. 3-5;
  so that a first subset of AWES within the plurality of AWES are in a production phase, and a different, second subset of AWES within the plurality of AWES are in a recovery phase, respectively, and
  S2 balancing the supply of power to the electrical grid according a demanded setpoint, cf. FIG. 7.

In short, the present invention relates to wind energy park connected to an electrical grid, having airborne wind energy systems AWES 100, e.g. with kites 101. The wind energy park (WEP) has an electrical DC network 506 connecting the plurality of AWES and a grid converter unit 504 for converting DC to AC, and transmit AC to the electrical grid. The wind energy park control unit 503 controls the AWES to produce electrical power to the electrical grid by alternating between a power production phase, and a recovery phase so to balance the supply of power to the electrical grid according a demanded setpoint. An advantage is that the grid converter may be smaller, as compared to an AC network, because the power is evened out with the negative power from the AWES being in recovery phase. In this way, the invention stabilises the grid and has a grid forming capability.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. A wind energy park connected to an electrical grid, the wind energy park comprises:
   a first airborne wind energy system (AWES) comprising:
      a first kite connected via a first cable to a first ground station;
      a first winch system controlling extraction and retraction of the first said cable from the first ground station, the first winch system further being connected to a first electrical generator for converting kinetic, rotational energy to electrical power as a first alternating current (AC); and
      a first AC to DC converter for converting the first AC to direct current (DC);
   a second AWES comprising:
      a second kite connected via a second cable to a second ground station; and
      a second winch system controlling extraction and retraction of the second cable from the second ground station, the second winch system further being connected to a second electrical generator;
   an electrical DC network connecting the first AWES and the second AWES; and
   a wind energy park control unit configured to:
      operate the first AWES in a power production phase, during which the first cable is extracted by the first winch system so as to produce electrical power from the first electrical generator,
      while operating the first AWES in the power production phase, operate the second AWES in a recovery phase during which the second cable is retracted by the second winch system so as to consume electrical power from the second electrical generator; and
      in response to a fault ride through event (FRT) occurring in the electrical grid:
         operate the first AWES in the power production phase by further extracting the first cable by the first winch system so as to increase electrical power produced from the first electrical generator; and
         transition the second AWES to the power production phase by (i) adjusting a surface area of the second kite engaging the wind by adjusting tension in a steering line coupled to the second kite and (ii) extracting the second cable by the second winch system so as to increase electrical power produced from the second electrical generator.

2. The wind energy park according to claim 1, wherein, in response to a need for frequency regulation arising in the electrical grid:
   changing the first AWES from the recovery phase to the power production phase to increase active power produced from the first AWES, or
   changing the first AWES from the power production phase to the recovery phase to decrease active power produced from the first AWES.

3. The wind energy park according to claim 1, wherein the first AWES has a reduced power production by aerodynamically operating the first AWES so as to reduce an extraction force on the first cable.

4. The wind energy park according to claim 1, wherein the second AWES has an increased power consumption by actively lowering a length of the second cable from the second winch system.

5. The wind energy park according to claim 1, wherein the second AWES has an increased power consumption by aerodynamically operating the second AWES so as to increase a retraction force on the second cable.

6. The wind energy park according to claim 1, wherein the wind energy park control unit is arranged for controlling a third AWES during a zero-voltage ride through (ZVRT) event to be operated in a neutral mode neither producing nor consuming power by applying a mechanical brake on a third cable in a third ground station for the third AWES.

7. The wind energy park according to claim 1, wherein the wind energy park further comprises electrical switching equipment capable of consuming excess energy from the first AWES in case of a grid event, using a resistor in said electrical switching equipment.

8. The wind energy park according to claim 1, wherein the first AC to DC converter for converting the electrical power to direct current for the first AWES comprises an active rectifier with four quadrant operational capability.

9. The wind energy park according to claim 1, wherein the wind energy park is electrically connected to one, or more, energy storage units for use at least one of in case of a grid event, for storing excess energy, or delivering additional energy to electrical grid, if required.

10. The wind energy park according to claim 1, wherein the wind energy park is electrically integrated with one or more other power generating sources based on at least one of solar energy, hydro energy, geothermal energy, or wind energy from wind turbines mounted on the ground.

11. A wind energy park control unit for controlling an associated wind energy park connected to an electrical grid, the wind energy park comprises:
   a first AWES comprising:
      a first kite connected via a first cable to a first ground station;
      a first winch system controlling extraction and retraction of the first said cable from the first ground station, the first winch system further being connected to a first electrical generator for converting kinetic, rotational energy to electrical power as a first alternating current (AC),
      a first AC to DC converter for converting the first AC to direct current (DC),
   a second AWES comprising:
      a second kite connected via a second cable to a second ground station; and
      a second winch system controlling extraction and retraction of the second cable from the second ground station, the second winch system further being connected to a second electrical generator; and
      an electrical DC network connecting the first and second AWES,
   wherein the wind energy park control unit is configured to:
      operate the first AWES a power production phase during which the first cable is extracted by the first winch system so as to produce electrical power from the first electrical generator,
      while operating the first AWES in the power production phase, operate the second AWES in a recovery phase during which the second cable is retracted by the second winch system so as to consume electrical power from the second electrical generator; and
      in response to a fault ride through event (FRT) occurring in the electrical grid:
         operate the first AWES in the power production phase by further extracting the first cable by the first winch system so as to increase electrical power produced from the first electrical generator; and transition the second AWES to the power production phase by (i) adjusting a surface area of the second kite engaging the wind by adjusting tension in a steering line coupled to the second kite and (ii) extracting the second cable by the second winch system so as to increase electrical power produced from the second electrical generator.

12. A method for controlling a wind energy park connected to an electrical grid, the wind energy park comprises a first AWES and a second AWES, an electrical DC network connecting the first AWES and the second AWES, and a grid converter unit for converting DC to AC, and transmit said AC to said electrical grid, wherein the first AWES comprises:
a first kite connected via a first cable to a first ground station,
a first winch system controlling extraction and retraction of first cable from the first ground station, the first winch system further being connected to a first electrical generator for converting kinetic, rotational energy to electrical power as a first alternating current (AC),
a first AC to DC converter for converting the first AC to direct current (DC), wherein the second AWES comprises:
a second kite connected via a second cable to a second ground station; and
a second winch system controlling extraction and retraction of the second cable from the second ground station, the second winch system further being connected to a second electrical generator;

the method comprises:
operating the first AWES in a power production phase during which the first cable is extracted by the first winch system so as to produce electrical power from the first electrical generator,
while operating the first AWES in the power production phase, operate the second AWES in a recovery phase during which the second cable is retracted by the second winch system so as to consume electrical power from the second electrical generator;
in response to a fault ride through event (FRT) occurring in the electrical grid:
operating the first AWES in the power production phase by further extracting the first cable by the first winch system so as to increase electrical power produced from the first electrical generator; and
transition the second AWES to the power production phase by (i) adjusting a surface area of the second kite engaging the wind by adjusting tension in a steering line coupled to the second kite and (ii) extracting the second cable by the second winch system so as to increase electrical power produced from the second electrical generator.

13. A computer program product being adapted to enable a computer system comprising at least one computer having data storage means in connection therewith to control a wind energy park according to claim 12.

* * * * *